United States Patent [19]

Greco et al.

[11] Patent Number: 4,892,269

[45] Date of Patent: Jan. 9, 1990

[54] SPINNER DUCTED EXHAUST FOR PUSHER TURBOPROP ENGINES

[75] Inventors: Robert J. Greco, Tempe; Jack D. Betterton, Mesa, both of Ariz.

[73] Assignee: Allied-Signal Inc., Phoenix, Ariz.

[21] Appl. No.: 187,619

[22] Filed: Apr. 28, 1988

[51] Int. Cl.$^4$ .................. B64D 33/00; B64D 29/00
[52] U.S. Cl. ................... 244/53 R; 244/57;
244/65; 416/171; 416/93 R; 416/94; 60/262
[58] Field of Search ........... 244/121, 53 R, 57, 65;
416/93 R, 94, 171; 60/226.1, 262

[56] References Cited

U.S. PATENT DOCUMENTS

| | | | |
|---|---|---|---|
| 2,407,223 | 9/1946 | Caldwell | 244/53 |
| 2,456,151 | 12/1948 | Sawyer | 416/94 |
| 2,526,941 | 10/1950 | Fishbein | 416/171 |
| 2,575,415 | 11/1951 | Grimac | 416/94 |
| 2,604,276 | 7/1952 | Huben | 416/171 |
| 2,613,749 | 10/1952 | Price | 416/129 |
| 2,627,927 | 2/1953 | Mergen | 416/94 |
| 2,726,725 | 12/1955 | Nichols | 416/94 |
| 2,923,125 | 2/1960 | Rainbow | 60/226.1 |
| 3,811,791 | 5/1974 | Cotton | 416/171 |
| 4,171,183 | 10/1979 | Cornell et al. | 416/94 |
| 4,488,399 | 12/1984 | Robey et al. | 416/94 |
| 4,569,199 | 2/1986 | Klees et al. | 60/226.1 |

FOREIGN PATENT DOCUMENTS

| | | | |
|---|---|---|---|
| 763600 | 12/1951 | Fed. Rep. of Germany | 416/94 |
| 860037 | 9/1941 | France | 416/94 |
| 999942 | 10/1952 | France | 416/94 |

Primary Examiner—Joseph F. Peters Jr.
Assistant Examiner—Gregory R. Poindexter
Attorney, Agent, or Firm—R. Steven Linne; James W. McFarland

[57] ABSTRACT

A pusher turboprop engine is provided with an interior exhaust duct structure which directs the hot turbine gasses through and out of the engine nacelle to an annular duct mounted on the rear spinner which surrounds the propeller hub. The rotating annular duct includes blade-shaped shields which protect the roots of the propeller blades from the hot exhaust gasses and also pulls warmed cooling air through the engine nacelle thereby providing a rearwardly directed jet thrust to augment the propeller thrust.

18 Claims, 3 Drawing Sheets

SPINNER DUCTED EXHAUST FOR PUSHER TURBOPROP ENGINES

TECHNICAL FIELD

This invention relates generally to gas turbine driven propeller systems for aircraft propulsion and more specifically to an improved arrangement for ducting hot exhaust gasses through and out of the engine nacelle with minimum interference with downstream located propellers.

BACKGROUND OF THE INVENTION

Gas turbine driven propeller systems for aircraft propulsion (i.e., turboprops) have been generally known in the industry for a long time but recently there has been a renewed interest in such configurations because of several heretofore unappreciated advantages over conventional jet engines.

Turboprops may not fly as fast as jets but can be much more fuel efficient, especially on smaller planes. In addition, turboprops are generally more effective on shorter flights since they typically have higher rates of climb. One problem with conventional turboprops has been their high noise level but recent development of "pusher" configurations, in which the propellers are placed behind the engine and cabins, have essentially eliminated the problem and produced an exceptionally quiet cabin. However, there are several new problems created by utilizing such a pusher configuration.

One of the major difficulties in designing a pusher propeller installation for modern aircraft, when a gas turbine engine is used as the power source, is to prevent mutual interference between the pusher propellers and the exhaust jet without seriously reducing either the propeller efficiency or jet thrust. Propeller efficiency is typically reduced by about 3 to 7 percent when hot exhaust gasses are dumped into the atmosphere upstream of the propeller blades into their flow path. Further, exhaust of the hot jet through the propeller blades usually introduces vibrational and thermal problems in the blades and simultaneously interferes with the exhaust jet. Modern non-metallic, or even aluminum, propeller blades cannot long resist the hot jet. Even when the exhaust is mixed with cold ambient air to reduce its temperature to only a few hundred degrees, thermal fatigue shortens the life of the blades and, of course, reduces the amount of jet thrust available for propulsion.

Several approaches have been proposed to avoid or solve some of these problems. Deflection of the jet gasses laterally to a point beyond the propeller radius has been tried (see, for example, U.S. Pat. No. 2,604,276) but results in an excessive sacrifice of space in order to accommodate a gas duct of sufficient length and volume to carry the exhaust to a safe distance outboard of the propellers. In addition, the introduction of pronounced bends in the exhaust path, or the placement of the exhaust vent at an angle to the line of flight, leads to losses in jet thrust and to other detrimental effects, such as increased back pressure on the turbine, which reduces the power available for propeller thrust, and decreased aerodynamic efficiency due to higher drag losses.

Another problem with turboprop engines involves proper cooling of the engine nacelle and internal components. Since the propeller system by itself cannot usually supply an adequate flow of cooling air, especially at low air speeds on the ground during idle and when the propellers are "feathered", additional internal cooling fans are usually required. However, the additional weight and power consumption of such fans are detrimental to overall efficiency.

In view of the foregoing, it should be apparent that there is a need in the art for improvements in the design of pusher turboprop engines. Therefore, it is a primary object of the present invention to provide an improved method of, and structure for, ducting turbine exhaust directly out the rear of the engine nacelle without passing through the nacelle sidewalls.

It is also an object of the present invention to provide a turboprop engine in which standard pusher propellers can be separated from the detrimental effects of the hot turbine exhaust gasses.

It is further an object of this invention to achieve such a separation with a minimum of loss in jet thrust or loss in propulsive force from the propellers.

Another object of this invention is to provide an improved method of cooling a turboprop engine at low air speeds by pulling air through the engine nacelle.

SUMMARY OF THE INVENTION

The present invention aims to overcome the disadvantages of the prior art as well as offer certain advantages by providing a turboprop engine having a novel exhaust duct structure which includes a rearwardly-directed internal gas channel, which directs the hot products of combustion from the turbine outlet ports into a nozzle-like momentum exchange chamber where warmed nacelle cooling air is educted into the gas stream. The combined gas stream is forced through a downstream annular exhaust passage formed around and integral with the rotatable spinner which covers the pusher propeller hub assembly. Within the annular exhaust passage are hollow, aerodynamically shaped cuffs circumscribing each propeller blade root to protect them from the hot gas stream. More importantly, the annular passage and cuffs define a ducted fan structure which, due to the rotation of the spinner assembly, pulls the gas stream from the momentum exchange chamber.

The present invention not only provides an aerodynamically smooth nacelle without protruding exhaust horns (which reduces aerodynamic drag by about 10%) but also ensures adequate cooling of the turboprop engine and components during low air speed operation, such as ground idle or taxiing, wherein the mass air flow through the turbine would not, without the propeller driven ducted fan, be sufficient to aspirate enough cooling air through the nacelle.

During normal flight operation, when sufficient ram air is available to cool the engine, the exhaust gas stream is flowing fast enough that little or no power need be consumed by the ducted fan. While the shape and angle of the cuffs in the ducted fan may be designed to provide various ratios of jet thrust to propeller thrust, it is preferred that the overall efficiency, not the combined thrust, is maximized at the designed cruising speed.

Since the propeller blades are protected from direct contact with the hot exhaust gasses by the hollow blade shaped cuffs, standard or non-metallic blade assemblies may be used without the vibration and thermal problems usually associated with pusher turboprop engines.

BRIEF DESCRIPTION OF THE DRAWINGS

While this specification concludes with claims particularly pointing out and distinctly claiming the subject matter which is regarded as the invention, it is believed that the objects, features and advantages thereof may be better understood from the following detailed description of a presently preferred embodiment when taken in connection with the accompanying drawings in which:

DESCRIPTION OF THE PREFERRED EMBODIMENT

Figure 1:
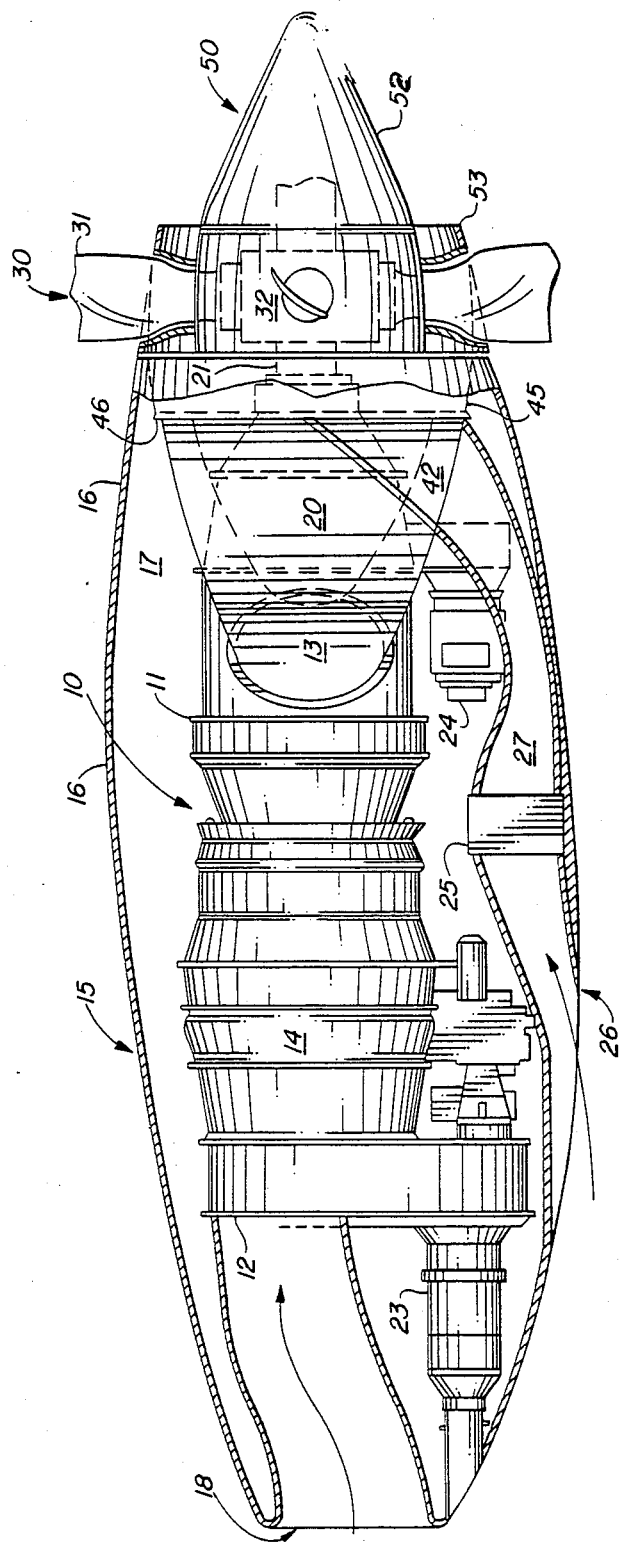
FIG. 1 is a side elevational view, in partial cross-section, illustrating a turboprop engine incorporating the present invention.

FIG. 1 illustrates a partial sectional view through a pusher turboprop engine assembly incorporating the present invention. The assembly generally comprises a gas turbine engine (10) surrounded by an aerodynamic housing or nacelle (15) and connected, through a speed reducing gear box (20) on its aft end, to a standard propeller mechanism (30) which is surrounded by a rotatable spinner assembly (50).

In more detail, the turbine engine (10) includes an elongate fore-and-aft extending engine housing (11) defining a main air inlet port (12), in the forward end, and having at least one, but preferably two, exhaust outlet ports (13) located on each side of the housing near the aft end. The housing (11) contains the typical compressor, combustor, and turbine sections (14) along with their associated operating components (not shown) for producing a flow of high temperature pressurized combustion products and mechanical power. The engine (10) also includes the usual accessories, such as a starter (23), generator (24), oil cooler (25), and other well-known operating components.

Mechanical power is extracted from the engine (10) by an output shaft (21) through an in-line gear box (20) located rearwardly of the exhaust outlet ports (13).

The nacelle (15) includes an outer sheet metal skin or wall (16) which surrounds the engine (10) and gearbox (20) with an aerodynamically favorable outward configuration. A nacelle cavity (17) is thereby formed between the outer wall (16) and the engine housing (11). The lower portion of the nacelle (15) also includes a cooling air inlet (26) which directs air through the engine oil cooler (25) and thence rearwardly through cooling air exhaust duct (27) towards and out the aft end of the nacelle as will be explained in more detail later. The forward end of the nacelle (15) includes a main air inlet (18), communicating combustion air to the turbine inlet port (12), while the aft end of the nacelle terminates at a transverse plane located between the gearbox (20) and the spinner assembly (50).

Figure 2:
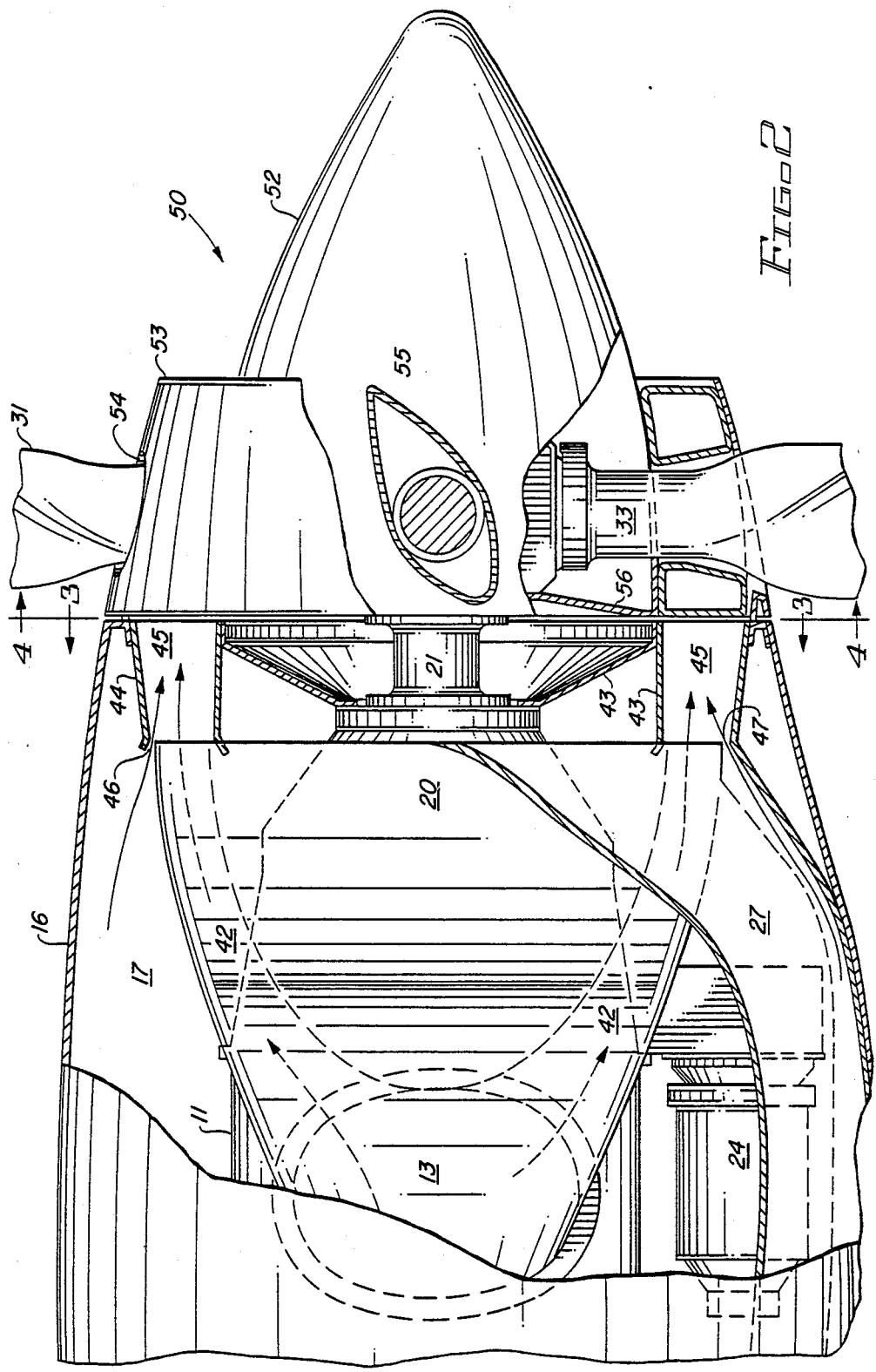
FIG. 2 is an enlarged view of the rearward portion of FIG. 1 showing additional details.
Figures 3, 4:
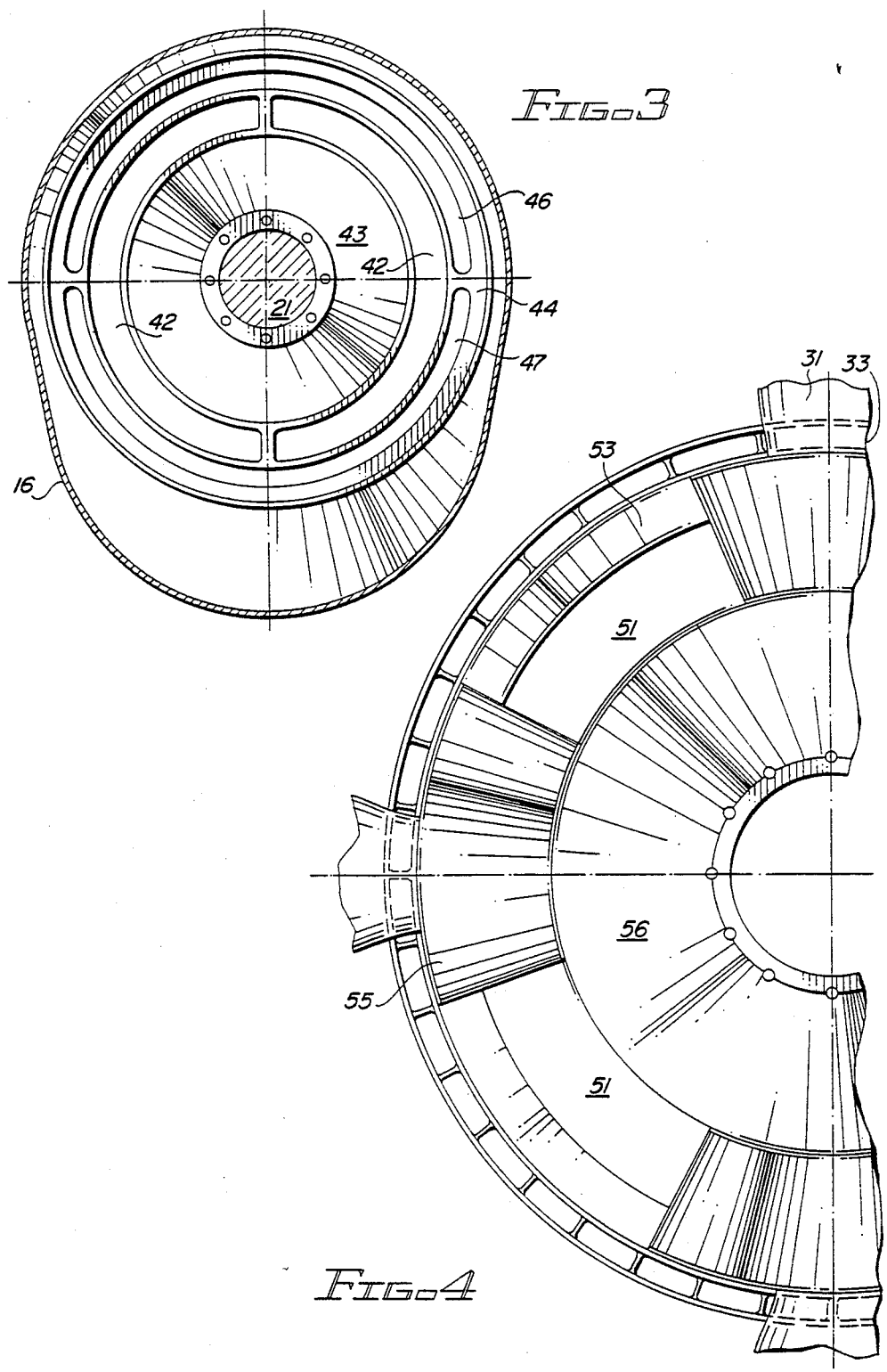
FIG. 3 is a transverse cross-sectional end view of the engine taken along line 3—3 of FIG. 2.
FIG. 4 is a transverse cross-sectional end view of the spinner taken along line 4—4 of FIG. 2.

As shown more clearly in FIGS. 2 and 3, the aft end of the nacelle includes an annular, open-ended momentum exchange chamber (45) formed between the nacelle skin (16), or more preferably a sheet metal attachment thereto (44), and the aft bulkhead (43) surrounding the gearbox output shaft (21). This chamber (45) is open rearwardly to duct work (51) in the spinner assembly as explained later and open forwardly so as to be in flow alignment with: first, an exhaust transition duct (42) communicating to the turbine outlet port(s) (13); second, a nacelle air injector inlet (46) communicating to the nacelle cavity (17); and third, a cooling air injector inlet (47) communicating to the cooling air exhaust duct (27). Preferably, the exhaust transition ducts (42) are constructed to terminate in two semicircular outlets arranged on each side half of the nacelle, while the nacelle air injector inlet (46) and the cooling air injector inlet (47) are semicircular openings arranged in the top half and bottom half, respectively, of the nacelle.

A rotatable spinner assembly (50) is located aft of the nacelle (15) and includes an outer wall portion (53), which is configured to be an aerodynamic extension of the nacelle, and a smaller, rearwardly convergent, conical inner portion (52), which provides environmental protection to the propeller mechanism (30). Generally, the outer wall portion (53) extends about ½ or ⅔ of the length of the inner portion (52). However, it may extend to the rearmost tip of the spinner.

Between the inner portion (52) and the outer portion (53) is an annular exhaust passage (51) which is generally aligned with the momentum exchange chamber (45). Within the annular exhaust passage (51) are several radially extending, hollow, airfoil-shaped cuff members (55) which loosely surround the root portion (33) of the propeller blades (31). As shown more clearly in FIG. 4, the exhaust passages (51) open into the atmosphere aft of the cuff-protected propeller blades (31). A spinner bulkhead (56) is preferably provided to protect the interior of the spinner, which contains the propeller mechanism (30), from the environment.

The propeller mechanism (30), shown in FIG. 1, is well-known in the art and generally includes a hub (32) containing the pitch control machinery (not shown) and three to six radially extending propeller blades (31). Each of the blades (31) are attached to the hub (32) at its root (33) and passes radially through an opening in the spinner inner wall (52), through the hollow cuff member (55), and finally through an opening (54) in the spinner outer wall (53).

The operation of this turboprop engine is similar in many respects to that of prior art engines except for the handling of the air and exhaust flow as discussed below. Basically, the turbine engine (10) ingests air and fuel into the gas generator portion (14), the details of which are not shown, to produce mechanical power to drive the propellers and a high temperature, high velocity exhaust jet.

In conventional tractor turboprops, which have the propeller and gearbox mounted on the forward end of the engine (thereby severely restricting the design of the air intake), some (about 10-15%) of the total available engine power is used as jet thrust to augment the propeller thrust during cruise. However, in prior art pusher turboprops which have exhaust horns out the sides of the nacelle forward of the propellers, almost none (less than about 5%) of the jet thrust is useable and most of the engine power is used for propeller thrust. In contrast, the present invention provides for varying the amount of total engine power utilized as either jet thrust or propeller thrust so as to maximize the overall efficiency or meet other design considerations. Presently, preferred is a ratio of about 10-15% jet thrust and 85-90% propeller thrust, not counting the usual internal losses.

The turbine exhaust flows from the outlet ports (13), around the gearbox (20) through transition ducts (42)

and into the momentum exchange chamber (45) where its kinetic energy or momentum is used to aspirate warmed air from the two closely adjacent injectors (46) and (47) before exiting through the spinner duct (51) as a rearwardly directed jet.

The cooling air injector (47) draws air through the engine oil cooler (25) to extract energy therefrom, while the nacelle injector (46) draws warm air from the cavity (17) surrounding the engine and accessories. Sufficient cooling air is easily provided during normal flight operation because of the large mass flow through the turbine (10) and into the momentum exchange chamber (45). However, during lower power operations, such as ground idling or taxiing, there is usually not enough mass flow through the engine to aspirate sufficient cooling air. In that case, the rotating spinner exhaust passage (51) acts like a ducted fan, because of the blade-shaped cuff members (55), and pulls air through the momentum exchange chamber (45).

While there is at least one cuff member (55) around each propeller blade root (33), it may be advantageous to include additional blade shaped members in the exhaust passage (51), especially when the number of propellers is few, e.g. three, or the minimum design speed of the spinner (50) is slow, so that sufficient cooling air flow is maintained.

From the above description it should be apparent that the propulsion engine arrangement described by mounting the propeller assembly to the rear of the turbine engine enables the engine to have a conventional intake unimpeded by the presence of a propeller and gearbox while at the same time provides a suitable method of ducting the engine exhaust to the atmosphere without interference with the aft-mounted propellers or unnecessary loss of jet thrust.

While in order to comply with the statute, this invention has been described in terms more or less specific to one preferred embodiment, it is expected that various alterations, modifications, or permutations thereof will be apparent to those skilled in the art. Therefore, it should be understood that the invention is not to be limited to the specific features shown or described but it is intended that equivalents be embraced within the spirit and scope of the invention as defined by the appended claims.

What is claimed is:

1. Aircraft apparatus having a forward flight direction and comprising:
    a combustion turbine engine, said engine including an elongate fore-and-aft extending housing defining an inlet port through which is inducted ambient air, a compressor receiving said inducted air and discharging said air pressurized, a combustor receiving said pressurized air along with a supply of fuel to support combustion producing a flow of pressurized high temperature combustion products, a turbine rotatable in said flow of combustion products to extract mechanical power therefrom for driving connection to a rearwardly extending rotatable output shaft having a direction of rotation and being carried exclusively by said engine, and an outlet port communicating with ambient and discharging said flow of combustion products at a relatively lowered temperature and pressure from said engine;
    a rotatable propeller unit having a hub carried by said output shaft rearwardly of said engine and drivingly connecting thereto for delivering mechanical power therefrom to a plurality of radially extending propeller blade members carried by said hub, each propeller blade member of said plurality including a root portion adjacent said hub and an aerodynamic airfoil portion extending radially outwardly of said root portion, said propeller unit rotatingly reacting with ambient air to generate propulsive force for conveyance to said aircraft via said engine;
    nacelle means for providing environmental protection to said engine while affording an aerodynamically favorable outward configuration, said nacelle having an air inlet, opening to ambient and communicating ambient air to said engine inlet port, said nacelle cooperating with said engine housing to define a nacelle cavity enveloping the latter, and said nacelle terminating rearwardly at a transverse plane proximate to but forward of said plurality of propeller blade members, means for inflow of ambient cooling air to said nacelle cavity;
    generally rearwardly convergent conical spinner means extending rearwardly from said transverse plane for providing environmental protection to said propeller mechanism while affording an aerodynamically favorable outward configuration, said spinner means also defining a fore-and-aft extending annular exhaust passage opening forwardly at said transverse plane and opening rearwardly in an annular opening aft of said plurality of propeller blade members, a plurality of radially extending cuff members each receiving therein a respective one of said plurality of propeller blade members adjacent the root portion thereof, said cuff members extending radially across said annular exhaust passage to therein define an airfoil shape effective upon rotation of said spinner member in said direction of rotation to urge fore-to-aft air flow within said exhaust passage;
    transition duct structure, at a forward end thereof communicating with said engine outlet port to receive said flow of combustion products, said transition duct structure extending rearwardly to terminate forwardly of said transverse plane in a semicircular outlet, an annular momentum exchange chamber forwardly aligning with said transition duct outlet to define an inlet to said momentum exchange chamber and extending aft to align at said transverse plane with said annular exhaust passage of said spinner means, said transition duct directing said flow of combustion products rearwardly across said momentum exchange chamber to induce additional gaseous inflow at said inlet thereof, and said momentum exchange chamber conveying said flow of combustion products and additional gaseous inflow to said spinner means exhaust passage for discharge to the atmosphere.

2. The aircraft apparatus of claim 1 wherein said inlet of said momentum exchange chamber communicates with said nacelle cavity whereby ambient ventilating air is moved through said nacelle cavity by a combined effect of momentum exchange with said flow of combustion products, as an ejector, and rotation of said spinner means, as a fan.

3. The aircraft apparatus of claim 1 wherein said nacelle means defines an inlet opening forwardly for receiving ambient ram air during forward motion of said aircraft, a cooling duct communicating with said inlet extending rearwardly and communicating at the aft end thereof with said inlet of said momentum exchange chamber, and heat exchange means disposed in said cooling duct for liberating heat to air flow therein, whereby ambient cooling air is moved from said inlet rearwardly through said cooling duct by a combined effect of momentum exchange with said flow of combustion products, as an ejector, and rotation of said spinner means, as a fan, without necessity of forward motion of said aircraft, and said cooling air is additionally moved through said cooling duct during forward aircraft motion by ram air effect.

4. The apparatus of claim 1 wherein said engine housing defines a pair of said outlet ports each generally diametrically opposite the other, a pair of said transition duct structures respectively communicating with said pair of outlet ports respectively, each one of said pair of transition duct structures defining a semicircular outlet substantially of 180° arcuate shape, said pair of transition duct structures joining forward of said respective outlets thereof to define an annularly continuous unitary outlet aligning with said annular passage of said spinner means.

5. The apparatus of claim 4 wherein said momentum exchange chamber is annular to circumscribe said engine housing.

6. The apparatus of claim 1 wherein said spinner means comprises a radially inner generally conical portion converging rearwardly from said transverse plane to terminate in a spinner tail portion, a radially outer annular portion spaced radially outwardly of said inner portion and extending rearwardly from said transverse plane to an aft annular edge; said inner portion and said outer portion cooperatively defining said annular exhaust passage, said forward opening thereof at said transverse plane, and said rearward opening thereof at said aft annular edge of said outer annular spinner portion.

7. The apparatus of claim 6 wherein each of said plurality of cuff members movably receives said respective one of said plurality of propeller blade members to permit pitch change of said propeller unit by pivotal movement of said plurality of propeller blade members upon said hub without interference by said spinner means.

8. A method of cooling the interior of a nacelle surrounding an aircraft turboprop engine, of the type having a rotatable propeller and spinner assembly mounted to a gearbox immediately downstream of the turbine engine, comprising the steps of:
providing structure defining an annular ducted fan circumscribing a portion of said spinner assembly, said portion including the propeller blades, and configuring said ducted fan to contain a plurality of hollow, aerodynamic fan blade members surrounding the root of each propeller blade;
aligning said ducted fan with the open aft end of said nacelle; and
rotating said ducted fan structure in unison with said propeller to assist the flow of cooling air through said engine nacelle.

9. The method of claim 8 further including the steps of:
providing an exhaust duct from the side of said engine and around said gearbox but completely internal of said nacelle and terminating adjacent the aft end of the nacelle and aligned with said ducted fan; and
directing the engine exhaust through said exhaust duct and into said ducted fan along with the cooling air to provide propulsive thrust therefrom.

10. In an aircraft having a body defining a forwardly disposed air inlet, a rearwardly disposed exhaust outlet, a combustion turbine engine communicating with said inlet and said outlet to provide motive power to said aircraft by driving a variable pitch propeller carried by said engine rearwardly thereof, and an enclosed space housing said engine within said body: the method of moving cooling air through said enclosed engine space at comparatively low speeds of said aircraft comprising the steps of:
providing structure defining an annular ducted fan circumscribing a hub portion of said propeller and from which a plurality of propeller blades radiate for pitch-varying pivotal movement, configuring said ducted fan with a plurality of hollow tubular aerodynamic fan blade members at least matching in number said plurality of propeller blades, and passing a radially inner portion of each one of said propeller blades through a respective one of said plurality of hollow fan blades to join with said hub;
providing an annular nozzle-like member receiving exhaust flow from said combustion turbine engine;
providing an annular momentum exchange chamber having an inlet receiving exhaust flow from said nozzle-like member;
communicating said inlet of said momentum exchange chamber also with said enclosed engine space;
employing said exhaust flow in said momentum exchange chamber to aspirate warmed cooling air from said enclosed engine space, and providing for inflow of fresh cooling air to said enclosed engine space as warmed cooling air is withdrawn therefrom;
aligning said momentum exchange chamber with said annular ducted fan,
rotating said ducted fan structure and propeller in unison to assist flow of said exhaust and vitiated air; and
employing the combined effect of aspiration by said momentum exchange chamber and fan flow to move cooling air through said enclosed engine space.

11. In an aircraft having an engine nacelle, a free turbine engine disposed within said nacelle, an output shaft driven by said free turbine of said engine, and an exhaust port from which flows combustion products from a gas generator portion of said engine, said combustion products powering said free turbine, and a variable pitch air screw having a range of rotational speeds being drivingly carried by said output shaft, so that said aircraft has at least two modes of operation characterized by: (a) ground handling—with aircraft air speed being slow, or stopped, and gas generator speed being ground idle or taxi speed and flow rate of combustion products also being comparatively low with propeller pitch being fine, or zero, to result in a low-range propeller rotational speed; and (b) flight operation with aircraft speed being comparatively high; the method of ensuring cooling air flow within said nacelle and around said turbine engine during both operational modes (a) and (b) comprising the steps of:
providing a forwardly opening cooling air inlet on said nacelle for receiving cooling air flow by ram air effect during operating mode (b);

providing an ejector structure, receiving at a nozzle portion thereof said flow of combustion products, and aspirating cooling air at an inlet of said ejector structure within said nacelle by momentum exchange with said combustion products to strongly assist cooling air flow during operating mode (b), while providing a comparatively smaller but significant effect on cooling air flow during operating mode (a);

providing an annular ducted fan structure coaxial with a hub portion of said air screw and rotating in unison therewith, said fan structure including thick airfoil-shaped hollow fan blades which movably receive therethrough radially extending blade root portions of said air screw, disposing said fan blades in a pitch position having the same sense as air foil portions of said air screw during forward propulsion of said aircraft;

flowing said combustion products and cooling air rearwardly from said ejector structure through said ducted fan structure to provide an assisting torque thereto via said fan blades during operating mode (b), and during operating mode (a) using said fan blades rotating at said lower-range speed to assist extraction of said combustion products and cooling air from said ejector structure;

whereby cooling air flow during operating mode (a) is achieved by the combined effects of ejector flow and fan-forced flow.

12. A turboprop engine for aircraft propulsion, of the type having a rotatable propeller and spinner assembly mounted at the aft end of a gas turbine engine, comprising:

a nacelle means for providing an aerodynamically favorable outward configuration for the gas turbine engine;

a turbine exhaust duct means for directing combustion products from the turbine engine to the atmosphere, said exhaust duct means located completely within the nacelle and terminating adjacent the aft end of the engine;

a ducted fan structure circumscribing a portion of said rotatable propeller and spinner assembly, said ducted fan structure generally aligned with the aft end of the engine and in flow communication with the turbine exhaust duct;

a plurality of propeller blades extending radially from the interior of the spinner, passing through the ducted fan structure, and extending beyond the ducted fan into the atmosphere; and a plurality of hollow fan blade members extending radially within the ducted fan and surrounding each of the propeller blades where they pass through the duct.

13. The engine of claim 12 wherein the turbine exhaust duct means includes a transition duct structure which has a forward end in communication with an outlet port in the side of the turbine engine and a rearward end terminating in a semicircular outlet adjacent an open-ended momentum exchange chamber located in the aft end of the nacelle.

14. The engine of claim 13 wherein said momentum exchange chamber is open rearwardly to the ducted fan structure and open forwardly to the transition duct outlet, a nacelle air injector, and a cooling injector; said nacelle injector communicating with the interior of the nacelle and said cooling injector communicating to a cooling duct.

15. Aircraft propulsion apparatus comprising:

a turbine engine having a rearwardly extending rotatable shaft;

a spinner downstream of the engine and driveably connected to the shaft;

turbine exhaust duct means for carrying hot, pressurized exhaust flow rearwardly from the engine to produce forward propulsion, said exhaust duct means defining an annular exhaust duct generally circumferentially symmetrically disposed about the spinner;

a cooling duct carried with the engine for receiving cooling airflow from the atmosphere;

an eductor nozzle disposed between the cooling duct and the exhaust duct means so that exhaust gas flow from said exhaust duct means draws cooling airflow through the cooling duct and through the nozzle into the exhaust duct means;

a plurality of propellers extending radially outwardly from the spinner and driven thereby to provide forward propulsion, said propellers disposed downstream of the exhaust gas flow exiting the exhaust duct; and a plurality of hollow fan blade members extending radially within the annular exhaust duct in surrounding relationship to the root portion of each propeller to protect the root portion from the hot exhaust gas flow.

16. The apparatus of claim 15 wherein said fan blade members are aerodynamically configured to draw exhaust gas flow rearwardly out of the exhaust duct upon rotation with the spinner and thereby assist in drawing cooling air flow through the duct.

17. The apparatus of claim 15 wherein the rearwardly exhaust flow produces at least 10% of the aircraft propulsion, the remainder produced by the propellers.

18. Apparatus for cooling the interior of a nacelle surrounding an aircraft turboprop engine comprising:

a gearbox drivingly connected immediately downstream of the engine within the nacelle;

a rotatable spinner and propeller assembly mounted to the gearbox adjacent the aft end of the nacelle;

an annular ducted fan structure circumscribing at least that portion of the spinner including the propeller blades and aligned with the aft end of the nacelle;

a plurality of hollow fan blade members extending radially within the annular duct and surrounding the root of each propeller blade where it passes through the annular duct;

an engine exhaust duct extending from the side of the engine and around the gearbox but completely internal of the nacelle, the exhaust duct terminating adjacent the aft end of the nacelle and aligned with the annular ducted fan structure; and eductor means for directing the engine exhaust from the exhuast duct to the annular ducted fan structure while aspirating cooling air through the nacelle.

* * * * *